United States Patent
Song et al.

(10) Patent No.: US 10,571,747 B2
(45) Date of Patent: Feb. 25, 2020

(54) DISPLAY APPARATUS

(71) Applicant: Samsung Display Co., Ltd., Yongin-si, Gyeonggi-do (KR)

(72) Inventors: Hyunhwa Song, Yongin-si (KR); Chanjae Park, Yongin-si (KR); Hayoung Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 225 days.

(21) Appl. No.: 15/641,668

(22) Filed: Jul. 5, 2017

(65) Prior Publication Data

US 2018/0011363 A1    Jan. 11, 2018

(30) Foreign Application Priority Data

Jul. 5, 2016  (KR) .................. 10-2016-0085061

(51) Int. Cl.
 *G02F 1/1335* (2006.01)
 *G02F 1/01* (2006.01)

(52) U.S. Cl.
 CPC ........ *G02F 1/13362* (2013.01); *G02F 1/0136* (2013.01); *G02F 1/133514* (2013.01); *G02F 1/133528* (2013.01); *G02F 1/133512* (2013.01)

(58) Field of Classification Search
 CPC ............... G03F 1/13362; G03F 1/0136; G03F 1/133514; G03F 1/133528
 USPC ........................................................ 362/19
 See application file for complete search history.

(56) References Cited

U.S. PATENT DOCUMENTS

| 6,208,463 | B1* | 3/2001 | Hansen | G02B 5/3058 |
| | | | | 359/485.05 |
| 6,894,750 | B2* | 5/2005 | Zhuang | G02F 1/093 |
| | | | | 349/106 |
| 7,123,317 | B2* | 10/2006 | Kwok | G02F 1/133617 |
| | | | | 349/71 |
| 8,947,619 | B2* | 2/2015 | Li | G02F 1/133617 |
| | | | | 349/106 |
| 9,118,037 | B2 | 8/2015 | Khachatryan et al. | |
| 2002/0180911 | A1* | 12/2002 | Iijima | G02F 1/133528 |
| | | | | 349/114 |
| 2003/0025863 | A1* | 2/2003 | Iijima | G02F 1/133555 |
| | | | | 349/122 |
| 2003/0076466 | A1* | 4/2003 | Ozawa | G02F 1/133514 |
| | | | | 349/113 |
| 2003/0227589 | A1* | 12/2003 | Iijima | G02F 1/133555 |
| | | | | 349/113 |

(Continued)

FOREIGN PATENT DOCUMENTS

| KR | 10-2007-0107438 A | 11/2007 |
| KR | 10-2010-0087101 A | 8/2010 |

(Continued)

*Primary Examiner* — Bryon T Gyllstrom
(74) *Attorney, Agent, or Firm* — Innovation Counsel LLP

(57) ABSTRACT

Provided is a display apparatus including a backlight unit; a substrate disposed above the backlight unit and including a first surface facing the backlight unit and a second surface opposite to the first surface; a plurality of color filters arranged on the second surface of the substrate; a polarizing plate disposed above the plurality of color filters; and a plurality of polarizers interposed between the polarizing plate and the backlight unit and arranged to correspond to the plurality of color filters, respectively.

20 Claims, 8 Drawing Sheets

(56) References Cited

U.S. PATENT DOCUMENTS

| | | | |
|---|---|---|---|
| 2004/0032556 A1* | 2/2004 | Yoon | G02F 1/133514 349/115 |
| 2008/0094550 A1* | 4/2008 | Tawaraya | G02B 5/201 349/106 |
| 2009/0290105 A1* | 11/2009 | Takada | G02F 1/133528 349/96 |
| 2010/0209630 A1 | 8/2010 | Watanabe et al. | |
| 2015/0036083 A1* | 2/2015 | Jang | G02F 1/133528 349/96 |
| 2015/0301402 A1 | 10/2015 | Kimura et al. | |
| 2016/0085118 A1* | 3/2016 | Lee | G02F 1/133512 349/62 |

FOREIGN PATENT DOCUMENTS

| | | |
|---|---|---|
| KR | 10-2015-0002279 A | 1/2015 |
| KR | 10-2015-0037694 A | 4/2015 |
| KR | 10-2015-0080115 A | 7/2015 |
| KR | 10-2015-0099751 A | 9/2015 |

\* cited by examiner

DISPLAY APPARATUS

CROSS-REFERENCE TO RELATED APPLICATION

This application claims the benefit of Korean Patent Application No. 10-2016-0085061, filed on Jul. 5, 2016, in the Korean Intellectual Property Office, the disclosure of which is incorporated herein in its entirety by reference.

BACKGROUND

1. Field

One or more embodiments relate to a display apparatus, and more particularly, to a display apparatus that may be easily thinned and may have improved flexibility.

2. Description of the Related Art

One of the most widely used display apparatuses is a liquid crystal display apparatus, which generally includes two substrates on which electric field generating electrodes, such as a pixel electrode and a common electrode, are formed, and a liquid crystal layer interposed therebetween. As a voltage is applied to the electric field generating electrodes, an electric field is formed in the liquid crystal layer. Based on the electric field, orientation of liquid crystal molecules of the liquid crystal layer is determined and polarization of incident light is changed, thereby displaying an image. Here, whether to transmit incident light through each pixel may be determined by using, for example, a polarizer.

As demands for personal electronic devices such as smartphones and tablet PCs increase, so does the demand for a portable display apparatus having a small thickness and that is lightweight.

However, in the case of a liquid crystal display apparatus, reducing a thickness of the liquid crystal display apparatus is limited by thicknesses of components including a liquid crystal layer, and thus, it is not easy to implement a flexible display apparatus.

SUMMARY

One or more embodiments include a display apparatus that are thin and have improved flexibility.

Additional aspects will be set forth in part in the description which follows and, in part, will be apparent from the description, or may be learned by practice of the presented embodiments.

According to one or more embodiments, a display apparatus including a backlight unit; a substrate disposed above the backlight unit and including a first surface facing the backlight unit and a second surface opposite to the first surface; a plurality of color filters arranged on the second surface of the substrate; a polarizing plate disposed above the plurality of color filters; and a plurality of polarizers interposed between the polarizing plate and the backlight unit and arranged to correspond to the plurality of color filters, respectively.

The backlight unit may be configured to emit a first linearly polarized light.

The first linearly polarized light may oscillate in a direction parallel to a polarization axis of the polarizing plate.

The backlight unit may be configured to emit non-polarized light.

The display apparatus may further include an additional polarizing plate interposed between the plurality of polarizers and the backlight unit.

The plurality of polarizers may be arranged on the first surface of the substrate.

The backlight unit may be configured to emit the first linearly polarized light, and, when a current is applied to the plurality of polarizers, the plurality of polarizers may convert the first linearly polarized light into second linearly polarized light, the second linearly polarized light being light linearly polarized in a direction different from a direction of polarization of the first linearly polarized light.

The direction in which the second linearly polarized light oscillates may be perpendicular to the direction in which the first linearly polarized light oscillates.

A ratio of conversion of the first linearly polarized light to the second linearly polarized light by the plurality of polarizers may be controlled according to intensity of a current applied the plurality of polarizers.

The plurality of polarizers may include silicon carbide (SiC).

The plurality of polarizers may include a conductive material.

The plurality of polarizers may include aluminum (Al).

A width of each of the plurality of polarizers may be greater than or equal to a width of each of the plurality of color filters.

The display apparatus may further include a counter substrate interposed between the plurality of color filters and the polarizing plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
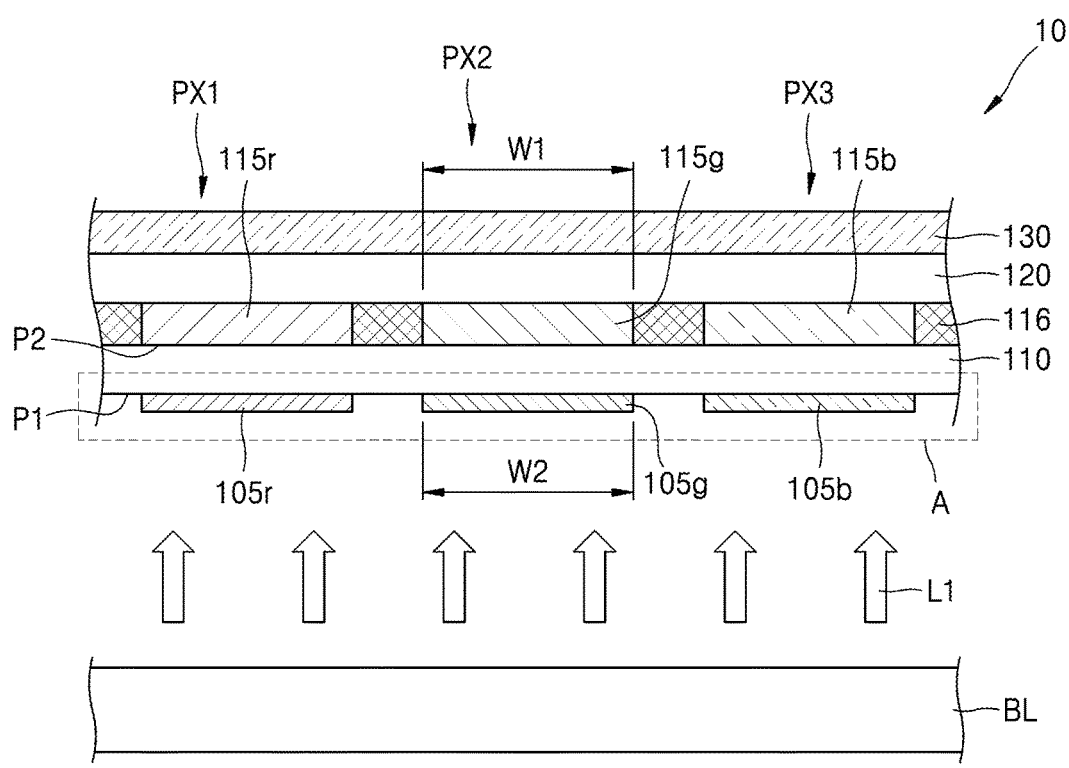
FIG. 1 is a schematic cross-sectional view of a portion of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As embodiments allow for various changes and numerous embodiments, particular embodiments will be illustrated in the drawings and described in detail in the written description. However, this is not intended to limit embodiments to particular modes of practice, and it is to be appreciated that all changes, equivalents, and substitutes that do not depart from the spirit and technical scope of embodiments are encompassed in embodiments. In the descriptions of embodiments, certain detailed explanations of the related art are omitted when it is deemed that they may unnecessarily obscure the essence of embodiments.

It will be understood that although the terms "first", "second", etc. may be used herein to describe various components, these components should not be limited by these terms. These components are only used to distinguish one component from another.

Hereinafter, example embodiments will be described in detail with reference to the accompanied drawings, in which like reference numerals denote like or corresponding elements throughout, and redundant descriptions thereof will be omitted. Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is a schematic cross-sectional view of a portion of a display apparatus according to an embodiment.

Referring to FIG. 1, a display apparatus 10 according to an embodiment includes a backlight unit BL, a substrate 110, a plurality of color filters 115r, 115g, and 115b, and a polarizing plate 130. Furthermore, a plurality of polarizers 105r, 105g, and 105b are disposed on a surface of the substrate 110. In this case, the display apparatus 10 includes a plurality of sub-pixels PX1, PX2, and PX3 that implement visible rays. According to an embodiment, the display apparatus 10 may include the first sub-pixel PX1 implementing a red color, the second sub-pixel PX2 implementing a green color, and the third sub-pixel PX3 implementing a blue color.

The backlight unit BL is a light-emitting device that uniformly irradiates light to an entire surface of a substrate of a display apparatus. The backlight unit BL may include one of various types of light sources including a cold cathode fluorescent lamp (CCFL), an external electrode fluorescent lamp (EEFL), a light-emitting diode (LED), an organic light-emitting diode (OLED), etc.

The backlight unit BL emits light toward the substrate 110. According to the present embodiment, the backlight unit BL emits first linearly polarized light L1, which is linearly polarized light, wherein the linearly polarized light means light oscillating in a specific direction. As described above, since the backlight unit BL emits linearly polarized light, a separate polarizing plate is not disposed on the backlight unit BL in the present embodiment. Therefore, a thickness of the display apparatus 10 may be reduced.

The substrate 110 is disposed above the backlight unit BL. The substrate 110 may be a glass substrate or a plastic substrate including polyethylene terephthalate (PET), polyethylene naphthalate (PEN), polyimide, etc.

The substrate 110 has a first surface P1 and a second surface P2. The first surface P1 refers to a surface of the substrate 110 facing the backlight unit BL, and the second surface P2 refers to a surface opposite to the first surface P1 of the substrate 110. As shown in FIG. 1, the first surface P1 is the bottom surface of the substrate 110, and the second surface P2 is the top surface of the substrate 110.

On the second surface P2 of the substrate 110, the plurality of color filters 115r, 115g, and 115b are disposed. The plurality of color filters 115r, 115g, and 115b may respectively include a red color filter 115r, a green color filter 115g, and a blue color filter 115b. The red color filter 115r is disposed to correspond to the first sub-pixel PX1 that implements a red color, the green color filter 115g is disposed to correspond to the second sub-pixel PX2 that implements a green color, and the blue color filter 115b is disposed to correspond to the third sub-pixel PX3 that implements a blue color.

The plurality of color filters 115r, 115g, and 115b may selectively transmit light of specific wavelengths only therethrough or may improve optical characteristics of light of specific wavelengths. For example, when white light is incident to the plurality of color filters 115r, 115g, and 115b, the red color filter 115r may selectively therethrough transmit only light of a wavelength corresponding to a red color and absorb light having other wavelengths. Similarly, the green color filter 115g may selectively transmit therethrough only light of a wavelength corresponding to a green color, and the blue color filter 115b may selectively transmit therethrough only light of a wavelength corresponding to a blue color.

Each of the plurality of color filters 115r, 115g, and 115b includes a coloring material and an organic material in which the coloring material is dispersed. The coloring material may be a conventional pigment or a dye, and the organic material may be a conventional dispersing agent. The plurality of color filters 115r, 115g, and 115b are disposed by independently patterning each of the red color filter 115r, the green color filter 115g, and the blue color filter 115b, where patterning techniques including a pigment dispersion technique, a printing technique, an electro-deposition technique, a film transfer technique, and a thermal transfer method may be used.

A black matrix 116 is disposed between adjacent color filters of the plurality of color filters 115r, 115g, and 115b. Therefore, the black matrix 116 is also disposed on the second surface P2 of the substrate 110. Here, an area that is not covered by the black matrix 116 is an area where an image is implemented (i.e., light is not blocked), and as such, the area may be defined as a sub-pixel or a light-emitting area. In other words, the black matrix 116 may be disposed between the first sub-pixel PX1 and the second sub-pixel PX2 and between the second sub-pixel PX2 and the third sub-pixel PX3.

The black matrix 116 absorbs visible rays incident from the outside, and prevents colors mixing and interference of visible rays emitted from adjacent color filters, thereby improving contrast of the display apparatus.

The black matrix 116 may be patterned on the substrate 110 before the plurality of color filters 115r, 115g, and 115b are disposed. As a result, openings may be formed in areas where the black matrix 116 is not patterned on the substrate 110, and the red color filter 115r, the green color filter 115g, and the blue color filter 115b may be disposed in the openings to correspond to the first sub-pixel PX1, the second sub-pixel PX2, and the third sub-pixel PX3, respectively.

The black matrix 116 may include various materials, e.g., a black organic material mixed with a black pigment, or Cr, $CrO_x$, or the like.

Although FIG. 1 shows that the black matrix 116 and the plurality of color filters 115r, 115g, and 115b have the same thickness, embodiments are not limited thereto, and the black matrix 116 may be disposed to be thinner than the plurality of color filters 115r, 115g, and 115b. When the black matrix 116 is disposed to be thinner than the plurality of color filters 115r, 115g, and 115b, the black matrix 116 may overlap portions of the plurality of color filters 115r, 115g, and 115b and may be disposed on a bottom surface of an upper layer located above the plurality of color filters 115r, 115g, and 115b. For example, the upper layer may be a counter substrate 120 described below.

The counter substrate 120 may be disposed on the plurality of color filters 115r, 115g, and 115b and the black matrix 116. The counter substrate 120 is disposed to face the substrate 110 to prevent deterioration and fracture of various layers interposed between the substrate 110 and the counter substrate 120.

The counter substrate 120 may be a glass substrate or a transparent plastic substrate, and an image of the display apparatus 10 is implemented in a direction toward the counter substrate 120.

The polarizing plate 130 may be disposed on the counter substrate 120. However, embodiments are not limited thereto, and the polarizing plate 130 may also be disposed below the counter substrate 120.

The polarizing plate 130 transmits some light emitted by the plurality of color filters 115r, 115g, and 115b, and blocks the remaining light from being transmitted. There are various ways for the polarizing plate 130 to selectively transmit light. However, according to an embodiment, the polarizing plate 130 may transmit only light oscillating in a specific direction and absorb light oscillating in other directions. By using the polarizing plate 130 having such characteristics, the display apparatus 10 may control an ON-OFF state of each of the sub-pixels PX1, PX2, and PX3.

According to the present embodiment, the polarizing plate 130 may transmit only light oscillating in a same direction as the first linearly polarized light L1 emitted by the backlight unit BL. In other words, a polarization axis of the polarizing plate 130 may be parallel to the direction in which the first linearly polarized light L1 oscillates.

The polarizing plate 130 may include a polarizer (not shown) selectively transmitting only light oscillating in a specific direction and a protective layer (not shown) disposed on at least one surface of the polarizer. The protective layer may prevent the polarizer from being degraded due to external light and light emitted by the backlight unit BL, and may prevent the polarizer from being damaged by an external force. When the counter substrate 120 is disposed on the polarizing plate 130, the counter substrate 120 may also perform the same function as the protective layer.

The plurality of polarizers 105r, 105g, and 105b may be disposed on the first surface P1 of the substrate 110. The plurality of polarizers 105r, 105g, and 105b replace a liquid crystal layer of a liquid crystal display apparatus in the related art and change polarization of light incident to the plurality of polarizers 105r, 105g, and 105b. Since the plurality of polarizers 105r, 105g, and 105b may be easily disposed by patterning a layer containing a specific material, the polarizers 105r, 105g, and 105b may have a smaller thickness than a liquid crystal layer in the related art, and thus, operations including orientation of liquid crystal molecules may be omitted. As a result, a thickness and a weight of the display apparatus 10 may be reduced, and thus, a flexible display apparatus may be easily implemented, and a total number of operations for manufacturing the same may be reduced.

The plurality of polarizers 105r, 105g, and 105b are arranged to correspond to the plurality of color filters 115r, 115g, and 115b. Specifically, the first polarizer 105r is disposed to correspond to the red color filter 115r that transmits red light, the second polarizer 105g is disposed to correspond to the green color filter 115g that transmits green light, and the third polarizer 105b is disposed to correspond to the blue color filter 115b that transmits blue light. Since the plurality of color filters 115r, 115g, and 115b may exhibit different light emission efficiencies according to a color of emitted light, the first polarizer 105r, the second polarizer 105g, and the third polarizer 105b may also have different sizes, thickness, and materials from one another.

When the plurality of polarizers 105r, 105g and 105b are located below the plurality of color filters 115r, 115g and 115b as in the present embodiment, width W2 of each of the plurality of polarizers 105r, 105g, and 105b may be greater than or equal to width W1 of each of the plurality of color filters 115r, 115g, and 115b. Therefore, light from the first linearly polarized light L1 incident to the plurality of color filters 115r, 115g, and 115b through the plurality of polarizers 105r, 105g, and 105b may be secured as much as possible, to thereby improve image quality of the display apparatus 10.

Although FIG. 1 shows that the plurality of polarizers 105r, 105g, and 105b are arranged between the backlight unit BL and the substrate 110, embodiments are not limited thereto, and the plurality of polarizers 105r, 105g, and 105b may be arranged on any layer as long as they are arranged below the polarizing plate 130. In other words, no problem should arise as long as the plurality of polarizers 105r, 105g, and 105b are arranged between the backlight unit BL and the polarizing plate 130. The reason for this is that a function of a liquid crystal layer in the related art for changing polarization of light incident to the polarizing plate 130 may be satisfactorily performed by the plurality of polarizers 105r, 105g, and 105b as long as light emitted from the backlight unit BL is incident to the polarizing plate 130 via the plurality of polarizers 105r, 105g, and 105b. However, for convenience of explanation, descriptions of the below embodiments and modifications thereof will be given in relation to a case in which the plurality of polarizers 105r, 105g, and 105b are arranged on the first surface P1 of the substrate 110. Hereinafter, referring to FIG. 2, a mechanism by which the plurality of polarizers 105r, 105g, and 105b may change polarization will be described in further detail.

Figure 2:
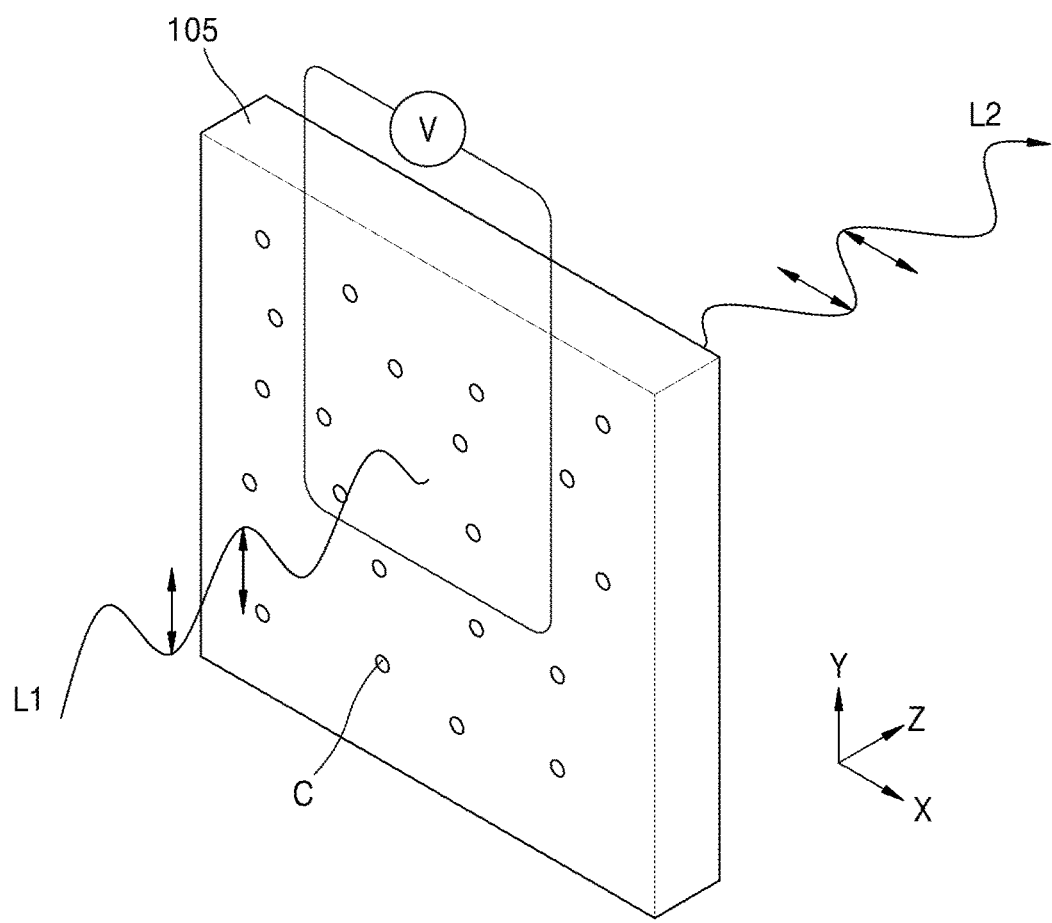
FIG. 2 is a schematic diagram showing an operation of a polarizer of the display apparatus of FIG. 1, according to an embodiment.

FIG. 2 is a schematic diagram showing an operation of a polarizer of the display apparatus of FIG. 1, wherein the polarizer of FIG. 2 refers to any one of the plurality of polarizers 105r, 105g, and 105b shown in FIG. 1.

Referring to FIG. 2, a polarizer 105 may be disposed by adding conductive particles C to materials having optical anisotropy. According to an embodiment, the polarizer 105 may be fabricated by patterning a semiconductor layer including silicon carbide (SiC) and doping the patterned semiconductor layer with aluminum (Al) particles as an impurity.

When a current is applied to the polarizer 105 including the above material, the conductive particles C doped in the polarizer 105 generate an electromagnetic field in a specific direction, and a direction of oscillation of light passing through the polarizer 105 is changed by the electromagnetic field. For example, as shown in FIG. 2, when the first linearly polarized light L1 oscillating in the Y-axis direction is incident to the polarizer 105, the first linearly polarized light L1 is converted into second linearly polarized light L2 oscillating in a direction different from the direction in which the first linear polarized light L1 was oscillating, and is transmitted through the polarizer 105. As shown in FIG. 2, the second linearly polarized light L2 may oscillate in the X-axis direction, and the X-axis direction may be substantially perpendicular to the Y-axis direction. As described above, the polarizer 105 has a same or similar function as a liquid crystal layer for changing polarization of light, and may change a direction of oscillation of light 10 times or more faster as compared to a liquid crystal layer.

Here, the first linearly polarized light L1 refers to the first linearly polarized light L1 incident to the plurality of polarizers 105r, 105g, and 105b from the backlight unit BL as shown in FIG. 1, and the second linearly polarized light L2 emitted from the polarizer 105 is also linearly polarized light like the first linearly polarized light L1. The Z-axis direction, which is the direction in which the first linear polarized light L1 and the second linearly polarized light L2 travels, refers to a direction in which the backlight unit BL emits light in FIG. 1, that is, a direction toward the polarizing plate 130. Hereinafter, a technique for displaying an image of the display apparatus 10 of FIG. 1 using the polarizer 105 of FIG. 2 will be described in further detail with reference to FIGS. 3A through 3C.

Figure 3A:
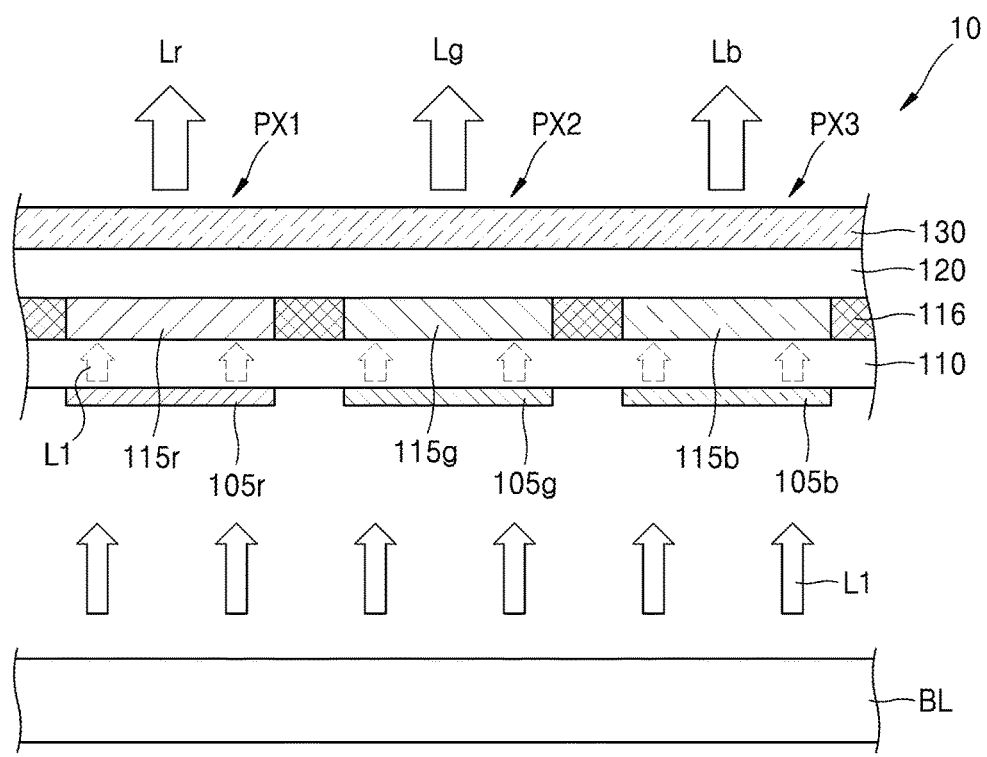
FIGS. 3A, 3B and 3C are schematic cross-sectional diagrams showing states in which the display apparatus of FIG. 1 emits light, according to an embodiment.
Figure 3B:
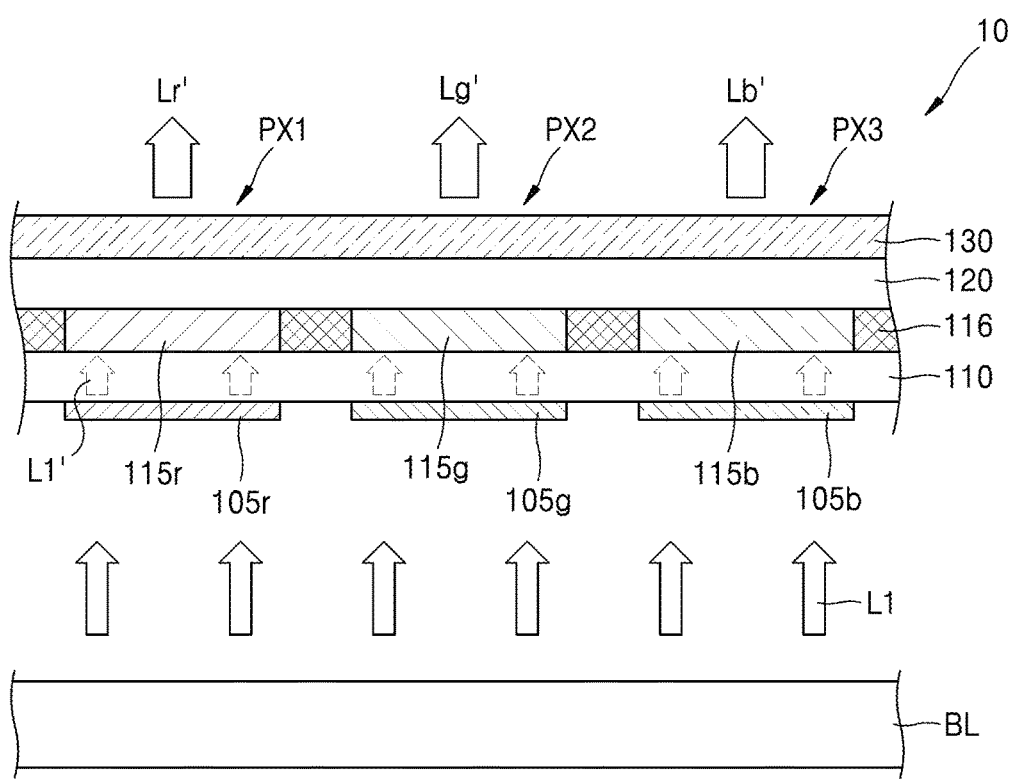
Figure 3C:
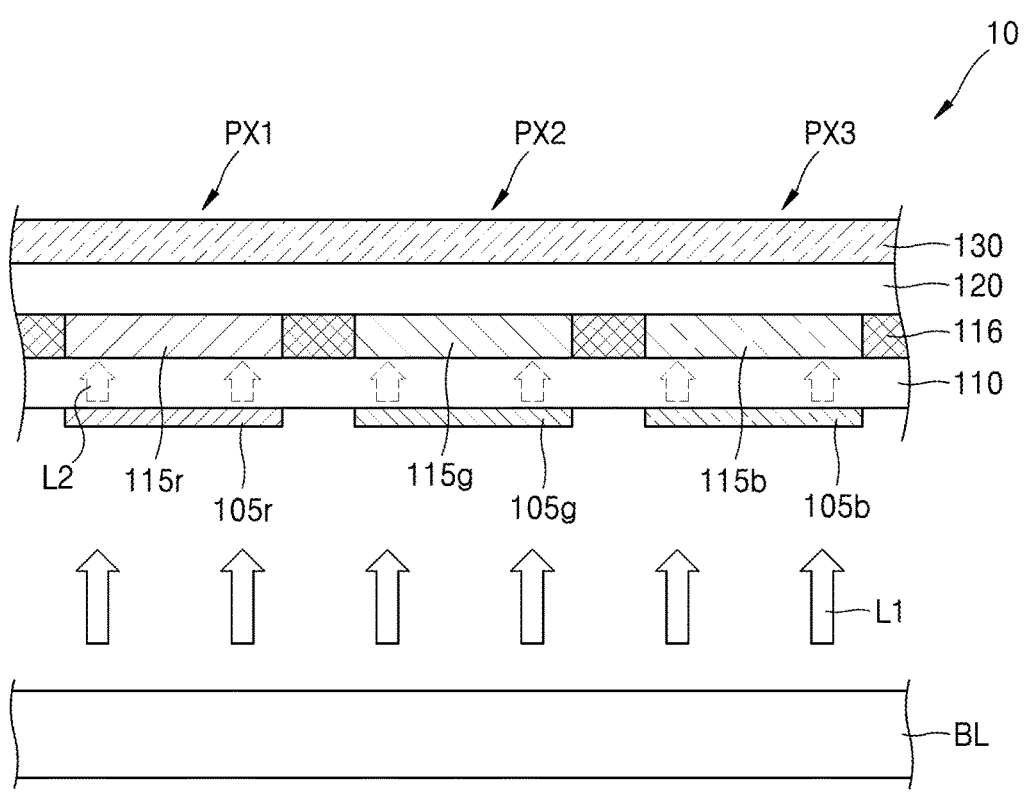

FIGS. 3A through 3C are schematic cross-sectional diagrams showing states in which the display apparatus of FIG. 1 emits light. FIG. 3A is a cross-sectional diagram showing a state in which no current is applied to the plurality of polarizers 105r, 105g, and 105b, FIG. 3B is a cross-sectional diagram showing a state in which a relatively weak current is applied to the plurality of polarizers 105r, 105g, and 105b, and FIG. 3C is a cross-sectional diagram showing a case where a relatively strong current is applied to the plurality of polarizers 105r, 105g, and 105b. FIGS. 3B and 3C will be described below by focusing on their differences from FIG. 3A.

First, referring to FIG. 3A, the first linearly polarized light L1 emitted from the backlight unit BL is incident to the plurality of polarizers 105r, 105g, and 105b. At this time, since no current is applied to the plurality of polarizers 105r, 105g, and 105b, the first linearly polarized light L1 is transmitted by the plurality of polarizers 105r, 105g, and 105b as it is. Accordingly, the first linearly polarized light L1 emitted through the plurality of polarizers 105r, 105g, and 105b travels while maintaining the previous direction of oscillation. Specifically, the first linearly polarized light L1 is transmitted through the first polarizer 105r, the second polarizer 105g, and the third polarizer 105b in correspondence to the first sub-pixel PX1, the second sub-pixel PX2, and the third sub-pixel PX3, respectively.

The first linearly polarized light L1 transmitted through the plurality of polarizers 105r, 105g and 105b is incident to the plurality of color filters 115r, 115g, and 115b through the substrate 110. Specifically, at least some of the light transmitted through the first polarizer 105r is incident to the red color filter 115r, at least some of the light transmitted through the second polarizer 105g is incident to the green color filter 115g, and at least some of the light transmitted through the third polarizer 105b is incident to the blue color filter 115b. The first linearly polarized light L1 incident to the plurality of color filters 115r, 115g, and 115b as described above is converted to light of a wavelength corresponding to red light, light of a wavelength corresponding to green light, and light of a wavelength corresponding to blue light by the red color filter 115r, the green color filter 115g, and the blue color filter 115b, respectively. Filtered light (not shown) transmitted through the plurality of color filters 115r, 115g, and 115b as described above passes through the counter substrate 120 and is incident to the polarizer 130 while maintaining the direction of oscillation of the first linearly polarized light L1.

Next, the filtered light is transmitted through the polarizing plate 130 and is emitted as red light Lr, green light Lg, and blue light Lb in correspondence to the first sub-pixel PX1, the second sub-pixel PX2, and the third sub-pixel PX3, respectively. Since the polarization axis of the polarizing plate 130 is parallel to the direction of oscillation of the first linearly polarized light L1, the red light Lr, the green light Lg, and the blue light Lb oscillating in the same direction as the first linearly polarized light L1 pass through the polarizing plate 130 without being absorbed.

When a current is not applied to the plurality of polarizers 105r, 105g, and 105b and the polarization axis of the polarizing plate 130 is parallel to the direction of oscillation of the first linearly polarized light L1, the sub-pixels PX1, PX2, and PX3 are turned ON.

Next, referring to FIG. 3B, the first linearly polarized light L1 emitted from the backlight unit BL is incident to the plurality of polarizers 105r, 105g, and 105b. Here, since a relatively weak current is applied to the plurality of polarizers 105r, 105g, and 105b, the direction of oscillation of some of the first linearly polarized light L1 transmitted through the plurality of polarizers 105r, 105g, and 105b is changed. Therefore, intermediate polarized light L1' emitted through the plurality of polarizers 105r, 105g, and 105b is a mixture of light oscillating in the same direction as the first linearly polarized light L1 and light oscillating in a direction different from the direction of oscillation of the first linearly polarized light L1.

The intermediate polarized light L1' transmitted through the plurality of polarizers 105r, 105g, and 105b is incident to the plurality of color filters 115r, 115g, and 115b through the substrate 110. The intermediate polarized light L1' incident to the plurality of color filters 115r, 115g and 115b is emitted as light of a wavelength corresponding to red light, light of a wavelength corresponding to green light, and light of a wavelength corresponding to blue light by the red color filter 115r, the green color filter 115g, and the blue color filter 115b, respectively. Filtered light (not shown) transmitted through the plurality of color filters 115r, 115g, and 115b as described above passes through the counter substrate 120 and is incident to the polarizer 130 while maintaining the direction of oscillation of the intermediate polarized light L1'.

Next, the filtered light passes through the polarizing plate 130 and is emitted as red light Lr', green light Lg', and green light Lb' in correspondence to the first, second, and third sub-pixels PX1, PX2, and PX3, respectively. Here, the red light Lr', the green light Lg', and the blue light Lb' oscillating in the same direction as the first linearly polarized light L1 (that is, light of which a direction of oscillation is not changed by the plurality of polarizers 105r, 105g, and 105b) pass through the polarizing plate 130 without being absorbed. In other words, light of which a direction of oscillation is changed by the plurality of polarizers 105r, 105g, and 105b is absorbed by the polarizing plate 130 and is not emitted to outside the display.

When a relatively weak current is applied to the plurality of polarizers 105r, 105g, and 105b and the polarization axis of the polarizing plate 130 is parallel to the direction of oscillation of the first linearly polarized light L1, the pixels PX1, PX2, and PX3 are in a state of intermediate brightness instead of being in the ON-OFF state (e.g., ON state corresponds to maximum light transmission, and OFF state corresponds to minimum or no light transmission). Accordingly, gray/grayscale of the display apparatus 10 may be expressed by appropriately adjusting a rate of polarization change of the first linearly polarized light L1 incident to the plurality of polarizers 105r, 105g, and 105b.

Next, referring to FIG. 3C, the first linearly polarized light L1 emitted from the backlight unit BL is incident to the plurality of polarizers 105r, 105g, and 105b. Since a relatively strong current is applied to the plurality of polarizers 105r, 105g, and 105b, the direction of oscillation of all or most of the first linear polarized light L1 transmitted through the plurality of polarizers 105r, 105g, and 105b is changed. Therefore, the second linearly polarized light L2 emitted through the plurality of polarizers 105r, 105g, and 105b oscillates in a direction substantially different from the first linearly polarized light L1. For example, the second linearly polarized light L2 may be linearly polarized light that oscillates in a direction perpendicular to the direction of oscillation of the first linearly polarized light L1.

Next, the second linearly polarized light L2 transmitted through the plurality of polarizers 105r, 105g, and 105b is incident to the plurality of color filters 115r, 115g, and 115b through the substrate 110. The second linearly polarized light L2 incident to the plurality of color filters 115r, 115g, and 115b is emitted as light of a wavelength corresponding to red light, light of a wavelength corresponding to green light, and light of a wavelength corresponding to blue light by the red color filter 115r, the green color filter 115g, and the blue color filter 115b, respectively. Filtered light (not shown) transmitted through the plurality of color filters 115r, 115g, and 115b as described above passes through the counter substrate 120 and is incident to the polarizer 130 while maintaining the direction of oscillation of the second linearly polarized light L2.

Since all or most of the filtered light is oscillating in a direction different from the direction of oscillation of the first linearly polarized light L1, all or most of the filtered light is absorbed by the polarizing plate 130 thereafter. Therefore, no or little light is emitted from the polarizing plate 130. In other words, when a relatively strong current is applied to the plurality of polarizers 105r, 105g, and 105b and the polarization axis of the polarizing plate 130 is parallel to the direction of oscillation of the first linearly polarized light L1, the sub-pixels PX1, PX2, and PX3 are turned OFF.

As described above, by controlling a ratio of conversion of the first linear polarized light L1 to the second linearly polarized light L2, ON/OFF and gradation states of a display may be implemented. To this end, it is necessary to appropriately control a current applied to the plurality of polarizers 105r, 105g, and 105b. Hereinafter, a technique for applying a current to the plurality of polarizers 105r, 105g, and 105b will be described in more detail with reference to FIGS. 4A and 4B.

Figure 4A:
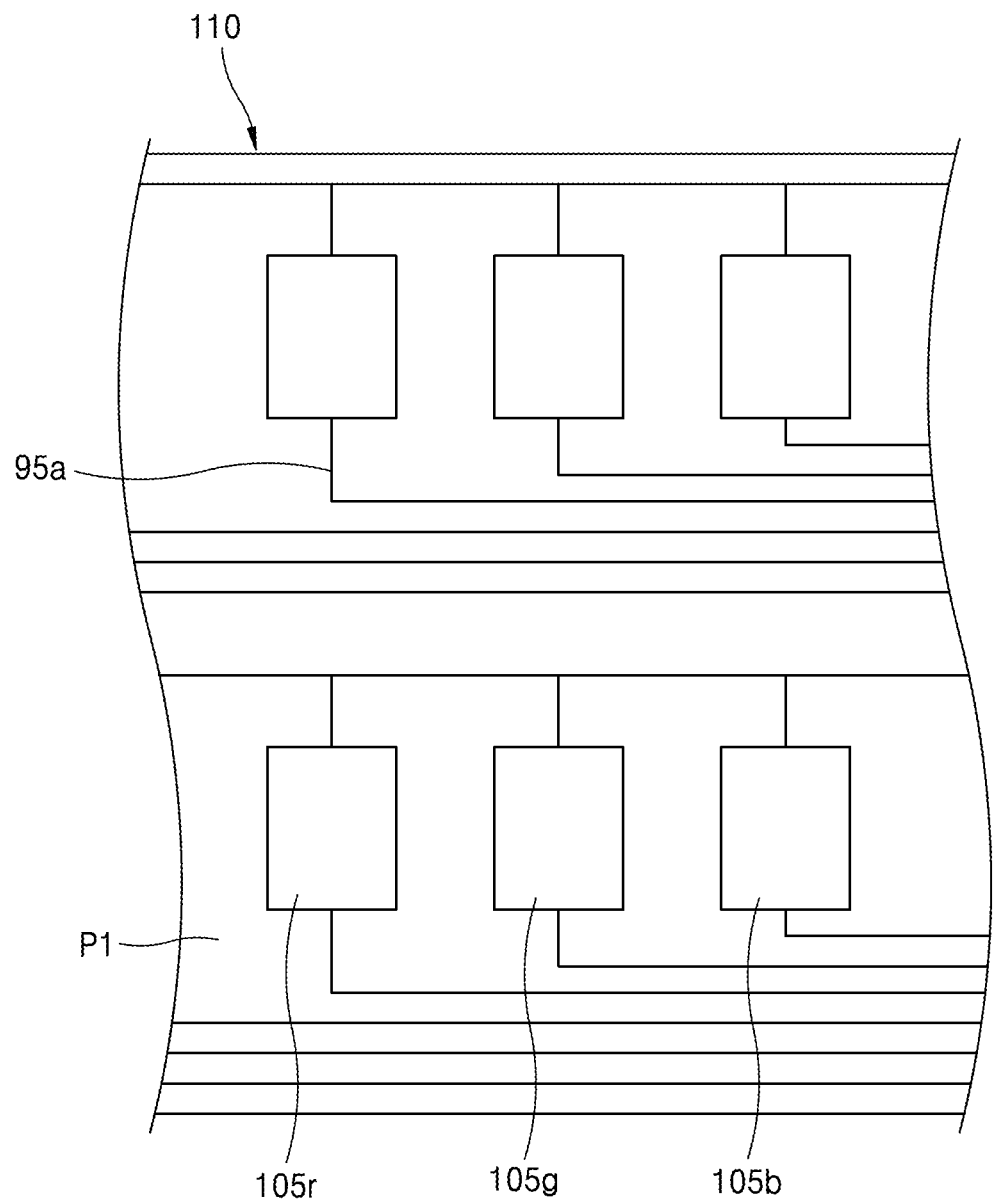
FIGS. 4A and 4B are schematic plan views of A of FIG. 1, according to an embodiment.
Figure 4B:
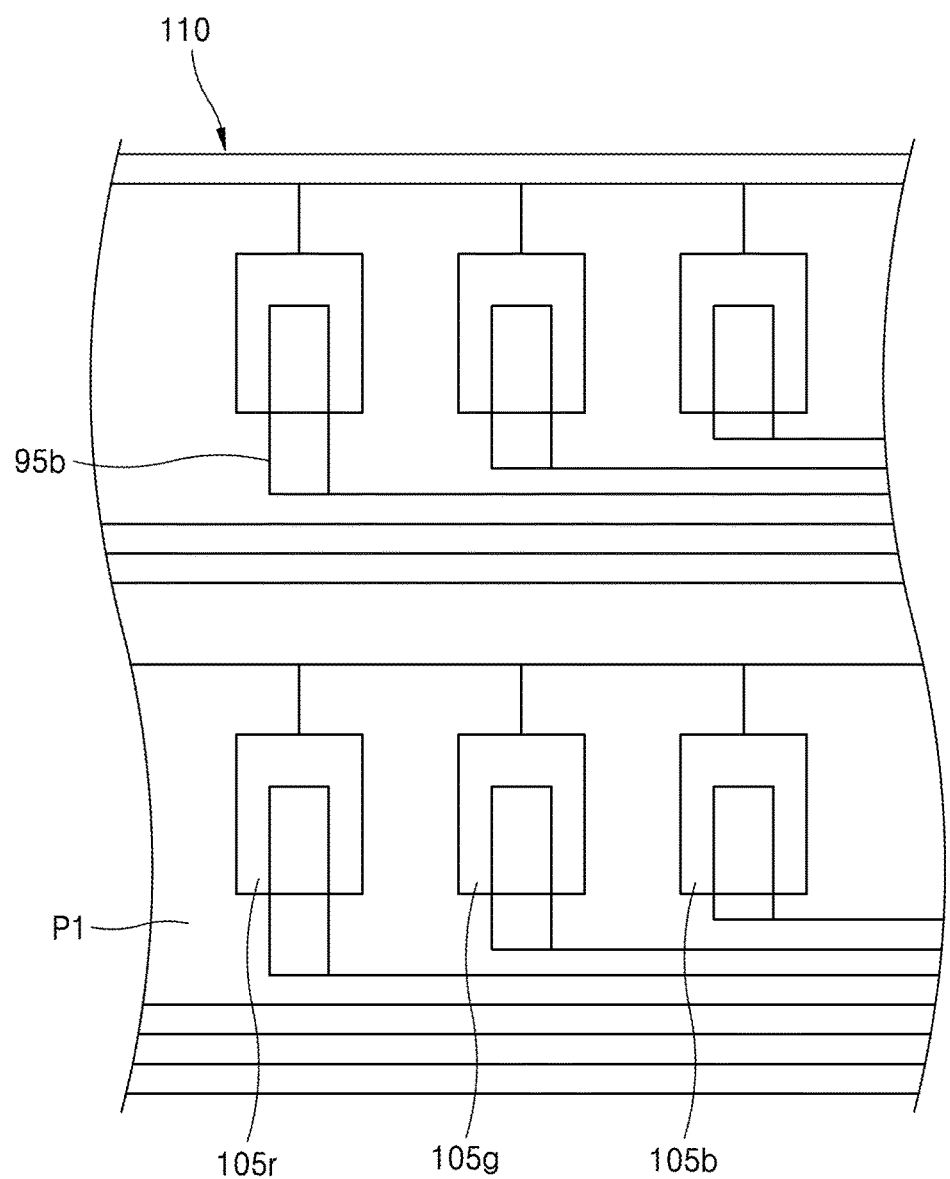

FIGS. 4A and 4B are schematic plan views showing A of FIG. 1, according to an embodiment.

Referring to FIGS. 4A and 4B, the plurality of polarizers 105r, 105g, and 105b are arranged to correspond to the plurality of color filters 115r, 115g, and 115b of FIG. 1. For example, the first polarizer 105r, the second polarizer 105g, and the third polarizer 105b may respectively correspond to the red color filter 115r, the green color filter 115g, and the blue color filter 115b in each of the first sub-pixel PX1, the second sub-pixel PX2, and the third sub-pixel PX3. Therefore, the plurality of polarizers 105r, 105g, and 105b may be arranged in a matrix-like shape on the first surface P1 of the substrate 110.

A circuit including a plurality of wires 95a is connected to the plurality of polarizers 105r, 105g, and 105b. Through such a circuit, a current is supplied to each of the plurality of polarizers 105r, 105g, and 105b. The plurality of wires 95a extend and are connected to a driver (not shown), and the driver (not shown) may be disposed in a non-display region where an image is not implemented. The driver (not shown) may be fabricated in the form of an integrated circuit chip directly mounted on the substrate 110, mounted on a flexible printed circuit film, or attached onto the substrate 110 in the form of a tape carrier package (TCP). Alternatively, the driver (not shown) may be disposed directly on the substrate 110.

As shown in FIG. 4A, wires connected to one end of the plurality of polarizers 105r, 105g, and 105b may be connected to one another as the single wiring 95a. Therefore, currents may be simultaneously applied to the plurality of polarizers 105r, 105g, and 105b through the single wiring 95a, respectively. Therefore, rates of change of polarization of the plurality of polarizers 105r, 105g, and 105b may also be controlled simultaneously.

Furthermore, as shown in FIG. 4B, wires 95b respectively connected to the plurality of polarizers 105r, 105g, and 105b may be disposed independently of one another. As a result, currents may be individually applied to the plurality of polarizers 105r, 105g, and 105b, respectively. Therefore, the rates of polarization change of the plurality of polarizers 105r, 105g, and 105b may also be individually controlled.

The circuit of the display apparatus 10 according to an embodiment is not limited to that shown in FIG. 4A or FIG. 4B, and various modifications may be made therein, e.g., a combination of the circuits shown in FIG. 4A and FIG. 4B. Furthermore, although not shown in FIG. 1, the substrate 110 may be a thin-film transistor array substrate in which a thin-film transistor array is disposed on a substrate to effectively control the plurality of polarizers 105r, 105g, and 105b. Such a thin-film transistor array substrate (not shown) includes a plurality of switching thin-film transistors electrically connected to the plurality of polarizers 105r, 105g, and 105b. Furthermore, a plurality of scan lines and a plurality of data lines may be connected to the switching thin-film transistors, and a driver (not shown) may include a scan driver for applying a scan signal to the plurality of scan lines and a data driver for applying a data signal to the plurality of data lines.

Figure 5:
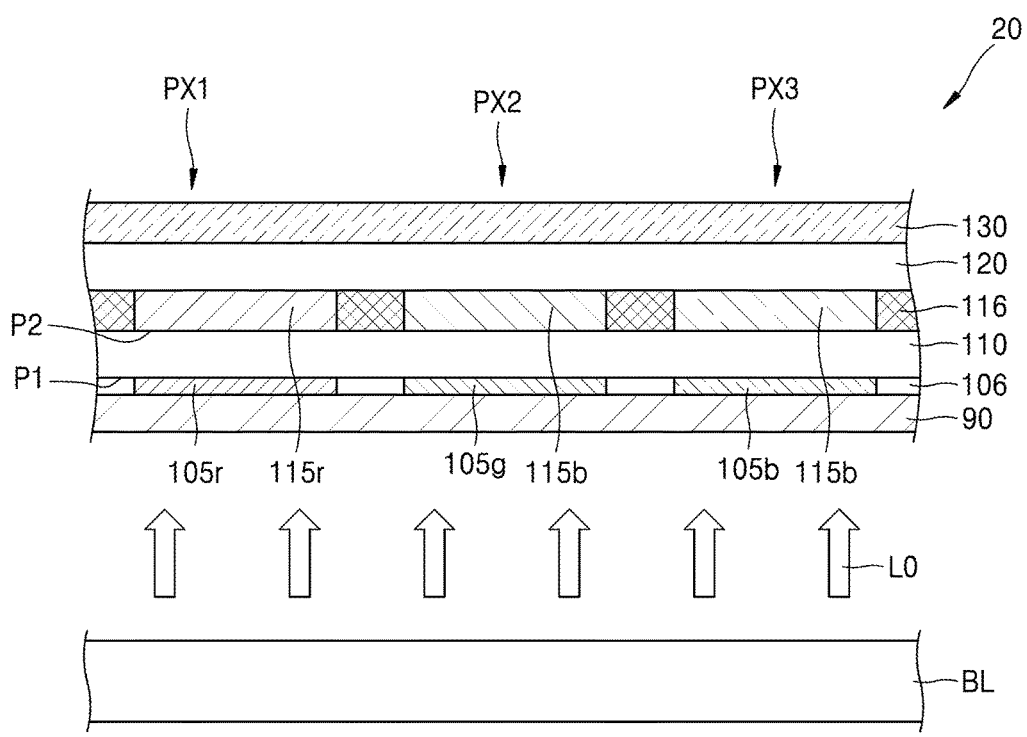
FIG. 5 is a schematic cross-sectional diagram showing a part of a display apparatus, according to another embodiment.

FIG. 5 is a schematic cross-sectional diagram showing a part of a display apparatus according to another embodiment. Hereinafter, the embodiment shown in FIG. 5 will be described in detail by focusing on its differences from the previous embodiments.

First, referring to FIG. 5, a display apparatus 20 according to another embodiment includes the backlight unit BL, the plurality of polarizers 105r, 105g, and 105b, the substrate 110, the plurality of color filters 115r, 115g, and 115b, and the polarizing plate 130, and an additional polarizing plate 90 is disposed between the plurality of polarizers 105r, 105g, and 105b and the backlight unit BL.

According to the present embodiment, unlike the display apparatus 10 of FIG. 1, the backlight unit BL emits non-polarized light L0, wherein the non-polarized light is light that is not polarized in a specific direction and is a mixture of linearly polarized light and circularly polarized light. Since light emitted by the backlight unit BL is non-polarized light, another polarizing plate is disposed above the backlight unit BL in the present embodiment. As a result, a wide range of common non-polarized light sources may be used.

The non-polarized light L0 emitted from the backlight unit BL passes through the additional polarizing plate 90 and is linearly polarized in the same direction as the first linear polarized light L1 of FIG. 1. Therefore, light incident to the plurality of polarizers 105r, 105g, and 105b oscillates in the same direction as the first linearly polarized light L1 of FIG. 1.

Meanwhile, the plurality of polarizers 105r, 105g, and 105b are interposed between the additional polarizing plate 90 and the substrate 110, and spacers 106 are formed between and adjacent to the plurality of polarizers 105r, 105g, and 105b. The spacers 106 may define a pixel region or a light-emitting region in the same manner as the black matrix 116, wherein a width of the spacers 106 may be smaller than or equal to a width of the black matrix 116. The spacers 106 may be empty space or may be filled with one of various insulating materials.

Since the layers disposed above the plurality of polarizers 105r, 105g, and 105b are identical to those of the display apparatus 10 of FIG. 1, descriptions thereof will be omitted.

As described above, according to an embodiment, flexibility may be imparted to a display apparatus, and a thickness and a weight of the display apparatus may be reduced. Furthermore, a number of processes for manufacturing a display apparatus may be reduced.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a backlight unit;
a substrate disposed above the backlight unit and comprising a first surface facing the backlight unit and a second surface opposite to the first surface;
a plurality of color filters arranged on the second surface of the substrate;
a polarizing plate disposed above the plurality of color filters; and
a plurality of polarizers interposed between the polarizing plate and the backlight unit and arranged to correspond to the plurality of color filters, respectively,
wherein each of the plurality of polarizer is connected to a wire through which a current is applied.

2. The display apparatus of claim 1, wherein the backlight unit is configured to emit a first linearly polarized light.

3. The display apparatus of claim 2, wherein the first linearly polarized light oscillates in a direction parallel to a polarization axis of the polarizing plate.

4. The display apparatus of claim 1, wherein the backlight unit is configured to emit non-polarized light.

5. The display apparatus of claim 4, further comprising an additional polarizing plate interposed between the plurality of polarizers and the backlight unit.

6. The display apparatus of claim 1, wherein the plurality of polarizers are arranged on the first surface of the substrate.

7. The display apparatus of claim 1, wherein the backlight unit is configured to emit a first linearly polarized light, and, when a current is applied to the plurality of polarizers, the plurality of polarizers convert the first linearly polarized light into a second linearly polarized light, the second linearly polarized light being light linearly polarized in a direction different from a direction of polarization of the first linearly polarized light.

8. The display apparatus of claim 7, wherein the direction in which the second linearly polarized light oscillates is perpendicular to the direction in which the first linearly polarized light oscillates.

9. The display apparatus of claim 7, wherein a ratio of conversion of the first linearly polarized light to the second linearly polarized light by the plurality of polarizers is controlled according to intensity of a current applied to the plurality of polarizers.

10. The display apparatus of claim 1, wherein the plurality of polarizers comprise silicon carbide (SiC).

11. The display apparatus of claim 1, wherein the plurality of polarizers comprise a conductive material.

12. The display apparatus of claim 1, wherein the plurality of polarizers comprise aluminum (Al).

13. The display apparatus of claim 1, wherein a width of each of the plurality of polarizers is greater than or equal to a width of each of the plurality of color filters.

14. The display apparatus of claim 1, further comprising a counter substrate interposed between the plurality of color filters and the polarizing plate.

15. A display apparatus comprising:
a backlight unit;
a substrate disposed above the backlight unit and comprising a first surface facing the backlight unit and a second surface opposite to the first surface;
a first polarizer disposed over the second surface of the substrate;
a plurality of color filters arranged on the second surface of the substrate;
a plurality of second polarizers patterned over the first surface of the substrate; and
a plurality of electrodes patterned and electrically connected to the plurality of second polarizers, respectively,
wherein a rate of polarization of the second polarizers is independently controllable according to electrical current inducing to the electrodes.

16. The display apparatus of claim 15, wherein each of the plurality of second polarizers comprises silicon carbide (SiC) and conductive particles doped in the silicon carbide (SiC).

17. The display apparatus of claim 16, wherein the conductive particles is aluminum particles.

18. A display apparatus comprising:
a backlight unit;
a substrate disposed above the backlight unit and comprising a first surface facing the backlight unit and a second surface opposite to the first surface;
a first polarizer disposed over the second surface of the substrate;
a plurality of color filters arranged on the second surface of the substrate; and
a plurality of second polarizers disposed on the first surface of the substrate,
wherein the backlight unit configured to emit linearly polarized light oscillating in a direction parallel to a polarization axis of the first or second polarizers, and
wherein each of the plurality of second polarizer is connected to a wire through which a current is applied.

19. The display apparatus of claim 18, wherein each of the plurality of second polarizers comprises silicon carbide (SiC) and conductive particles doped in the silicon carbide (SiC).

20. The display apparatus of claim 19, wherein the conductive particles is aluminum particles.

* * * * *